United States Patent [19]

Smith, Jr.

[11] 4,214,554

[45] Jul. 29, 1980

[54] FEEDING APPARATUS FOR NURSING ANIMALS

[76] Inventor: James L. Smith, Jr., 5742 Wilkins Ave., Oakdale, Calif. 95361

[21] Appl. No.: 940,022

[22] Filed: Sep. 6, 1978

[51] Int. Cl.$^2$ ............................................. A01K 9/00
[52] U.S. Cl. ......................................................... 119/71
[58] Field of Search ........................ 119/10, 18, 57, 60, 119/72.5, 71; 248/103, 311.3, 318

[56] References Cited

U.S. PATENT DOCUMENTS

| 241,220 | 5/1881 | Illoway et al. | 119/10 |
| 2,455,848 | 12/1948 | Young | 119/71 |
| 3,192,902 | 7/1965 | Gammill | 119/71 |
| 3,216,397 | 11/1965 | Pickard | 119/71 |
| 3,307,521 | 3/1967 | Tavera et al. | 119/71 |
| 3,452,717 | 7/1969 | Sunner | 119/71 |
| 3,958,535 | 5/1976 | Salvia | 119/71 X |

Primary Examiner—Louis G. Mancene
Assistant Examiner—Robert P. Swiatek
Attorney, Agent, or Firm—Blair, Brown & Kreten

[57] ABSTRACT

A feeding apparatus for nursing animals such as calves and the like which includes a frame having longitudinally extending frame members mounted on A-shaped end supports with transversely extending rods arranged in spaced-apart parallel relationship to define stall areas in side-by-side relationship on opposite sides of the frame, a nursing bottle retainer being provided on the frame members adjacent the front of each stall area on both sides of the frame for removeably supporting a nursing bottle in a downwardly inclined position for access by an animal in the stall area together with a longitudinally extending removeable bar supported on the ends of the rods on each side of the frame for retaining the nursing animal in its respective stall area.

6 Claims, 5 Drawing Figures

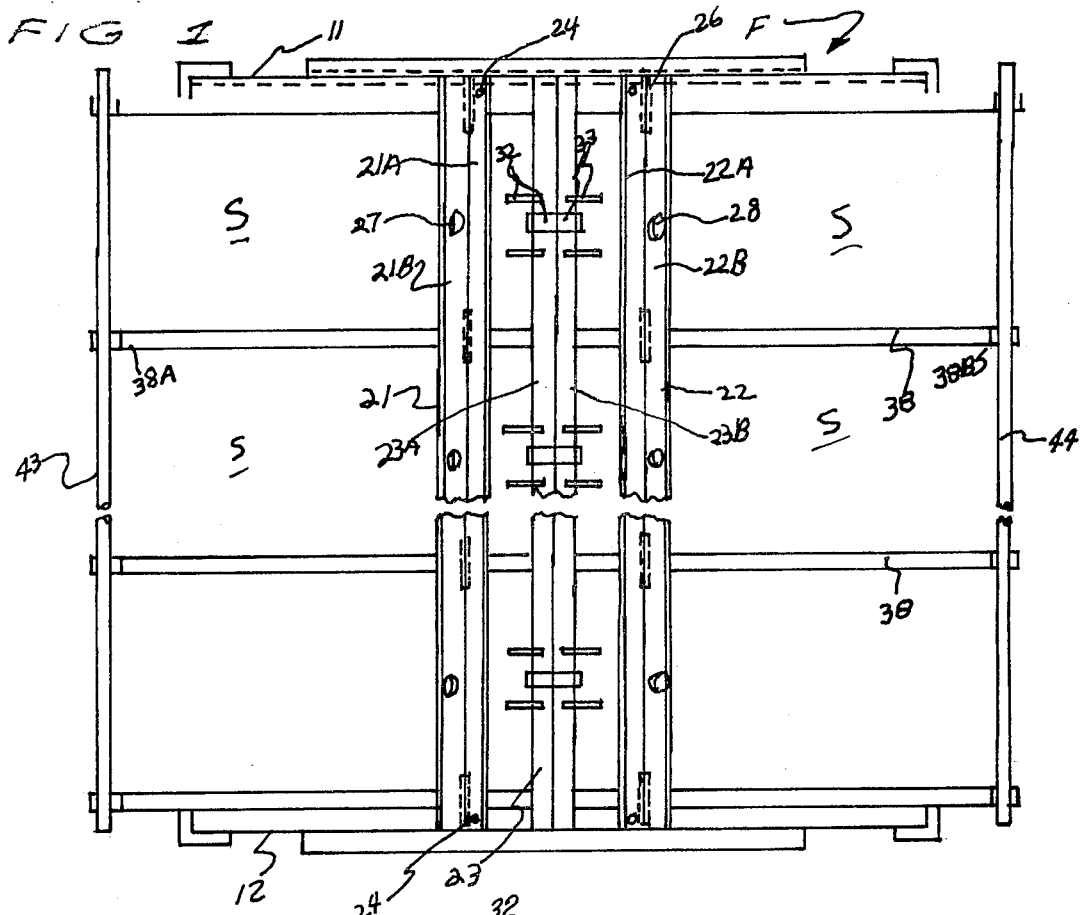
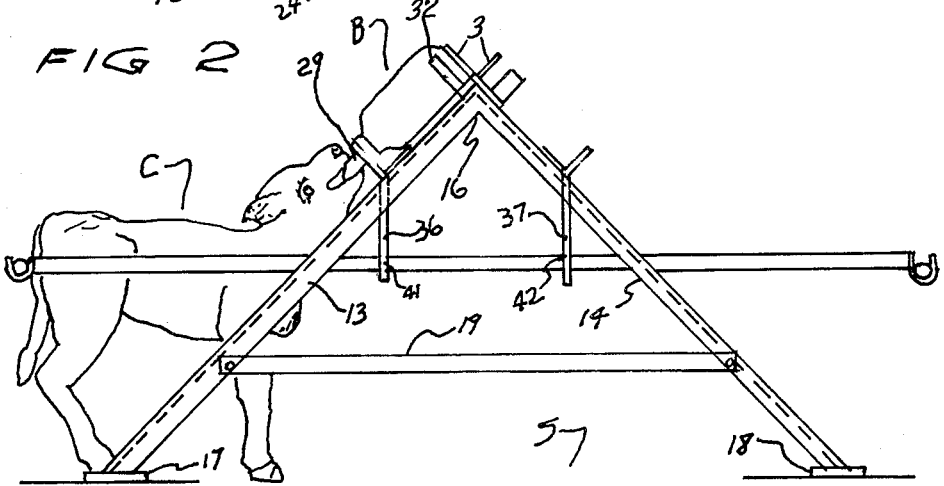
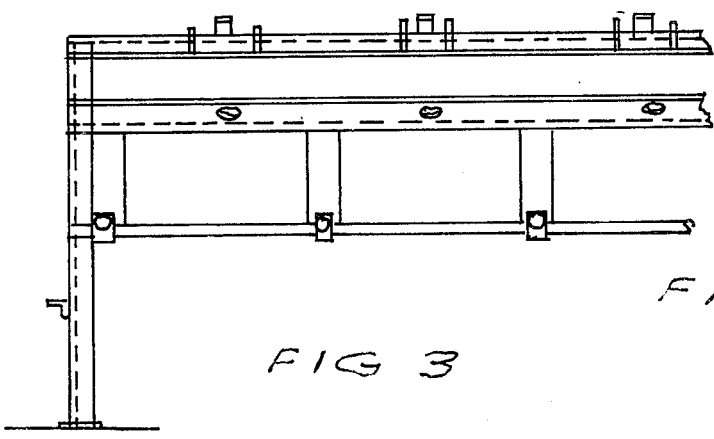
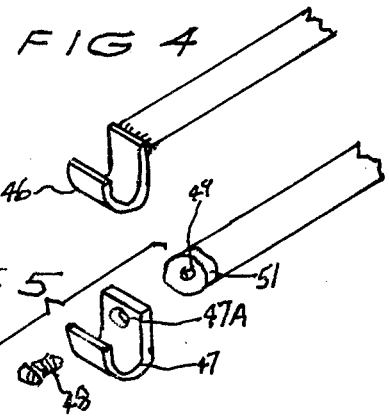
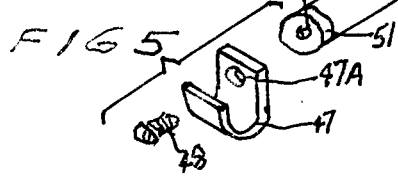

FEEDING APPARATUS FOR NURSING ANIMALS

BACKGROUND OF THE INVENTION

Animal feeding devices have been in widespread use in the prior art heretofore and patents of which applicant is aware include the following:
U.S. Pat. No. 2,455,848, Young; U.S. Pat. No. 3,216,397, Pickard;
U.S. Pat. No. 3,452,717, Sunner; U.S. Pat. No. 3,958,535, Salvia.

It is not infrequent that an animal in the nursing stage must be hand fed for many reasons such as the loss or unavailability of the mother or even an unwillingness on the part of the nursing animal to nurse from its own mother in a normal manner. Furthermore, many calves will not drink milk from a bucket until they are weaned.

Where the raising of animals is carried out on a relatively large scale such as is common in the raising of cattle, a dairy operation or the like there is consequently a large number of calves in the nursing stage which must be fed by means other than in the natural manner. The usual approach in feeding such calves is by hand with the use of a conventional nursing bottle having a nipple filled with a suitable liquid nutrient such as milk. Obviously, where there are many such nursing calves to be fed, a great burden is imposed on the cattle rancher or dairy farmer from both the standpoint of time and personnel involved.

OBJECTS AND SUMMARY OF THE INVENTION

Accordingly, a primary object of this invention is to provide a new and novel apparatus for simultaneously feeding a relatively large number of nursing animals such as calves.

Another object of the invention is to provide a new and novel apparatus for simultaneously feeding a large number of calves from milk-filled nursing bottles which is not only of simple and low cost construction but provides maximum utilization of space while assuring that the calves remain confined in individual nursing areas.

The objects stated above and other related objects are accomplished by the provision of a frame including a plurality of longitudinally extending frame members supported in an elevated position on a pair of end supports with downwardly extending brackets suspended from the frame members for supporting a plurality of transversely extending rod members in spaced-apart parallel relationship which define a plurality of stall areas extending along each side of the frame. A nursing bottle retainer is provided on the frame members adjacent the front of each stall area with each of the retainers arranged to support a nursing bottle having a nipple in a downwardly inclined inverted position for access to the nipple by a nursing calf in the adjacent stall area together with a longitudinally retaining bar removeably positioned on the outer ends of the rod members on opposite sides of the frame to confine the calves in the stall areas during nursing.

These and other objects and advantages of the invention will subsequently become apparent from the following detailed description when read in conjunction with the accompanying drawings.

BRIEF DESCRIPTION OF THE DRAWINGS

FIG. 1 is a plan view of the feeding apparatus of the invention;

FIG. 2 is an end view of the apparatus of FIG. 1 illustrating a calf in a feeding position;

FIG. 3 is a side view of a portion of the apparatus of FIG. 1;

FIG. 4 is a perspective view of a portion of a component part of the invention; and FIG. 5 is a perspective view of another portion of the component part of FIG. 4.

DESCRIPTION OF THE PREFERRED EMBODIMENTS

Referring now to the drawings and to FIG. 1 in particular there is shown a feeding apparatus constructed in accordance with the invention which includes a frame designated generally by the letter F. The frame F includes a pair of end supports 11, 12 preferably of A-shaped configuration as shown in FIG. 2 including a pair of angularly disposed end frame members interconnected at their upper ends to form an apex 16. The lower ends of the end frame members 13, 14 are provided with base plates 17,18 respectively for supporting engagement with a floor of the stall area S. The end supports 11, 12 are also provided with a bracing member 19, the ends of which are suitably connected to the end frame members 13, 14 as shown best in FIG. 2.

The frame F also includes a plurality of longitudinally extending, centrally disposed frame members 21, 22, 23 supported on their ends on the end supports 11,12. More specifically, the frame F includes side frame members 21,22 of substantially identical construction and extending along each side of the frame F in transversely spaced relationship. Each of the side frame members 21,22 are substantially L-shaped in cross sectional area so as to provide leg portions 21A, 21B on side frame members 21 and leg portions 22A, 22B on side frame member 22. Suitable means are provided for mounting the ends of the side frame members 21,22 on the end supports 11,12 and, in an illustrated embodiment, the leg portion 21A of side frame member 21 is secured by means of bolts 24 to the end frame members 13 of the end supports 11,12 at each end and side member 22 is secured by means of bolts 26 to the end frame members 14 of the end supports 11,12. In the mounted position, the leg portions 21B, 22B of the side frame members 21, 22 respectively extend upwardly in an angularly disposed position on opposite sides of the frame F as shown best in FIG. 2. As will be explained in detail hereinafter, the leg portions 21B, 22B are provided with a plurality of longitudinally spaced apertures 27, 28 respectively for accommodating the nipple 29 of a nursing bottle B with the top of the bottle B in supported engagement with the leg portions 21B, 22B as shown in FIG. 2.

The frame member 23 comprises a central frame member disposed intermediate the side frame member 21, 22 which is supported at each end on the end supports 11,12 and is preferably of inverted V-shaped cross sectional area for overlying supported engagement with the apex 16 of the end supports 11,12.

Retaining means for nursing bottles B are provided on the frame members 21,22, 23 for supporting a plurality of nursing bottles B in oppositely disposed pairs along the length of the frame F. More specifically, the leg portions 23A,23B of the central frame member 23 are provided with a group of upstanding tabs 32, 33 respectively each arranged in associated pairs as shown best in FIG. 1 in spaced apart relationship along the length of the central frame member 23. Each of the tab assemblies 32,33 are arranged to removeably accommodate the bottom end portion of a nursing bottle B in cooperation with the upstanding leg portions 21B, 22B of the side frame members 21, 22 respectively so that each nursing bottle B is supported in a downwardly inclined inverted position with the bottle nipple 29 extending through the associated apertures 27, 28 and the bottle bottom against abutment 3.

The frame F also includes a plurality of downwardly depending brackets 36,37 brackets 36 being suitably secured by welding or the like at their upper ends to the side frame member 21 and brackets 37 secured similarly at their upper ends to the side frame member 22. The brackets 36,37 are arranged in associated pairs intermediate the tab assemblies 32, 33 and apertures 27,28 on opposite sides of the frame F in longitudinally spaced apart relationship for supporting a plurality of transversely extending spaced apart rod members 38 which define therebetween stall areas S in which a nursing calf such as the calf C in FIG. 2 is confined during the nursing procedure. More specifically, the lower end portions of the brackets 36, 37 are provided with transversely aligned apertures 41,42 through which a rod member 38 is inserted so that the rod member 38 supported in the brackets 36, 37 extends laterally outward on opposite sides of the frame F. Thus, each adjacent pair of rod members 38 define a pair of oppositely disposed stall areas S in the front of which is disposed the bottle retaining means comprising the tab assemblies 32,33 and the leg portions 21B, 22B of the side frame members 21,22 respectively.

Referring now to FIGS. 4, 5, each end of the rod members 38 which are preferably of tubular form, are provided with a channel member for removeably accommodating longitudinally extending retaining bars 43,44. More specifically, the channel members 46, 47 are provided on opposite ends of the rod members 38 all of the channel members 46 and all of the channel members 47 being disposed in longitudinal alignment for removeably accommodating the retaining bars 43,44 respectively. As shown in FIG. 4, the channel members 46 are preferably fixedly secured to the end 38A of the rod members 38 by means of welding or the like. Channel member 47 attached to the other end 38B of the rod members 38 is preferably removeably attached by suitable means such as a screw 48 which is inserted through an opening 47A in the channel member 47 for threaded engagement with an internally tapped recess 49 formed within an end ferrule 51 suitably attached to the end 38B of the rod members 38. In this manner, the rod members 38 may be inserted through the apertures 41, 42 in the brackets 36, 37 respectively before attachment of the channel member 47 to permit the rod members 38 to be suitably positioned following which the channel members 47 are attached to the rod members 38 by means of the screw 48.

In the operation of the invention of the feeding apparatus a suitable number of nursing bottles B are filled with a nutrient such as milk and mounted in the inverted downwardly inclined position shown in FIG. 2 in each of the retaining means on the frame F with the nipple 29 extending through the appropriate aperture 27, 28 in the side frame members 21,22. One or more calves are then lead into its stall area S with the retaining bars 43, 44 removed following which the retaining bars are placed in the channel members 46,47 confining the calf C in its stall area S. The nursing bottle nipple 29 is therefore accessible to the confined calf C and the nursing procedure is carried out in the manner shown in FIG. 2.

Having thus described the preferred embodiment of the invention it should be understood that numerous structural modifications and adaptations may be resorted to without departing from the spirit of the invention.

What is claimed is:

1. A feeding apparatus for nursing animals such as calves or the like comprising, in combination, a frame including a pair of end supports and a plurality of longitudinally extending, centrally disposed frame members supported at each end in an elevated position on said end supports, a plurality of rod members supported on said frame members in spaced-apart, parallel relationship, said rod members extending laterally outward on both sides of said frame, each adjacent pair of said rod members defining oppositely disposed stall areas for said nursing animals, a plurality of nursing bottle retainer means mounted on said frame members for removeably supporting a nursing bottle having a nipple in a downwardly inclined inverted nursing position in association with each of said stall areas to thereby provide access to said nursing bottle by a nursing animal in said stall area including a longitudinally extending retaining bar removeably mounted on the outer ends of said rod members on each side of said frame for preventing backward movement of said nursing animals from said stall areas wherein said plurality of nursing bottle retaining means are arranged on said frame members in longitudinally spaced pairs with the retaining means in each of said pairs in oppositely disposed relationship and wherein said end supports are A-shaped in configuration having an apex and including a pair of angularly disposed end frame members interconnected at said apex and a bracing member connected at each end to one of said end frame members.

2. A feeding apparatus in accordance with claim 1 wherein said longitudinal frame members include a side frame member of L-shaped cross section on each side of said frame having a pair of leg portions and means for securing each end of one of said leg portions to said end frame members with the other of said leg portions disposed in an upwardly inclined position for supporting engagement with said nursing bottle, said other leg portion having a plurality of longitudinally spaced apertures for accommodating said bottle nipple in said nursing position.

3. A feeding apparatus in accordance with claim 2 wherein said plurality of frame members include a central frame member of inverted V-shaped cross section mounted at each end on the apex of said end supports intermediate said side frame members and wherein each of said bottle retaining means includes a plurality of upstanding tab assemblies on said central frame member for removeably accommodating the rear portion of said nursing bottle.

4. A feeding apparatus in according with claim 3 including a plurality of downwardly depending bracket members fixed to said side frame members and arranged in transversely aligned pairs on opposite sides of said frame, the lower end portion of each of said bracket members being provided with an aperture with said apertures in each of said pairs of bracket members in transversely aligned relationship for accommodating one of said rod members.

5. A feeding apparatus in accordance with claim 4 including a channel member on each end of each of said rod members, all of said channel members on each side of said frame being disposed in longitudinal alignment for accommodating said retaining bars.

6. A feeding apparatus in accordance with claim 5 wherein said channel member on one end of each of said rod members is fixedly secured to said rod member and wherein said channel member on the other end of each of said rod members is detachably mounted on said rod member to permit said rod member to be inserted through said apertures in said bracket members.

* * * * *